United States Patent [19]

Anderson

[11] Patent Number: 5,408,835
[45] Date of Patent: Apr. 25, 1995

[54] APPARATUS AND METHOD FOR PREVENTING ICE FROM FORMING ON A REFRIGERATION SYSTEM

[76] Inventor: J. Hilbert Anderson, 2422 S. Queen St., York, Pa. 17402-4995

[21] Appl. No.: 167,147

[22] Filed: Dec. 16, 1993

[51] Int. Cl.⁶ .......................................... F25D 21/12
[52] U.S. Cl. .......................................... 62/82; 62/282; 431/4
[58] Field of Search ............... 62/82, 282, 80, 272; 431/2, 4

[56] References Cited

U.S. PATENT DOCUMENTS

| | | | |
|---|---|---|---|
| 3,237,424 | 3/1966 | Lowcock | 62/82 X |
| 3,828,570 | 8/1974 | Stutz | 62/282 |
| 4,014,637 | 3/1977 | Schena | 431/4 |

*Primary Examiner*—Harry B. Tanner
*Attorney, Agent, or Firm*—Cushman Darby & Cushman

[57] ABSTRACT

The invention relates to a method for preventing ice from forming on a cooling system for air by adding an antifreeze to the air being cooled by the cooling system. The cooled air containing the antifreeze is then transferred a turbine engine, wherein the air and antifreeze are burned in the turbine engine. A condensed water and antifreeze mixture is also burned in the turbine engine. The invention also relates to an apparatus for preventing ice from forming on the refrigeration system for cooling air. The apparatus includes a sprayer for spraying the antifreeze onto the refrigeration system and/or the air being cooled by the refrigeration system, a collector for collecting a condensed water and antifreeze mixture, and a pump or transferring means for transferring the condensed water and antifreeze mixture to the turbine engine, where the antifreeze and condensed water mixture is burned.

14 Claims, 1 Drawing Sheet

APPARATUS AND METHOD FOR PREVENTING ICE FROM FORMING ON A REFRIGERATION SYSTEM

BACKGROUND OF THE INVENTION

1. Field of the Invention

This invention relates to an apparatus and method for preventing ice from forming on a cooling system, and more particularly to an apparatus and method for preventing condensed water from forming ice on evaporator coils of a refrigeration system on a power generating system.

2. Description of Related Art

The combustion gas turbine has long been used and very highly developed to generate power in electric power plants by burning natural gas, or other gaseous hydrocarbon fuels. The thermal efficiency, however, of such turbines is not very high and limited to values of the order of about 38% because all the heat of combustion has not been utilized fully.

To increase the efficiency of turbines it is known to refrigerate the air entering the gas turbine to temperatures well below ambient temperatures, such as about $-60°$ F. See "The Refrigerated Gas and Vapor Turbine Cycle", J. H. Anderson (1982).

By refrigerating the air prior to entering the air compressor, the density of the air is greatly increased. Therefore, the mass flow is increased and much more fuel can be burned to raise the gas temperature to the acceptable high combustion temperature of 2000° F. or higher. This results in significantly higher power output from the gas turbine.

However, when cooling air to temperatures below the freezing point of water, condensed water forms ice on the evaporator coils of a refrigeration system which significantly impedes the flow of air through the evaporator coils. Typically, the refrigeration system must be shut down to remove the ice formed on the evaporator coils.

It has been known to add an antifreeze solution to the air passing through the refrigeration system to prevent ice from forming on the evaporator coils. In conventional refrigeration systems, when an antifreeze solution is used to prevent water freezing on evaporator coils a special means must be used to recover the antifreeze because it becomes diluted with the condensed water.

An object of the present invention is to solve the problems associated with conventional methods of preventing ice from forming on a refrigeration system.

SUMMARY OF THE INVENTION

A first embodiment of the invention relates to a method for preventing ice from forming on a cooling system for air by adding an antifreeze to the air being cooled by the cooling system. The cooled air containing the antifreeze is then transferred into a turbine engine, wherein the air and antifreeze are burned in the turbine engine.

In another embodiment of the invention, a condensed water and antifreeze mixture is collected and the mixture is transferred to the turbine engine, wherein the mixture is burned in the turbine engine.

Another embodiment of the invention relates to an apparatus for preventing ice from forming on the refrigeration system for cooling air. The apparatus includes a sprayer for spraying the antifreeze onto the refrigeration system and/or the air being cooled by the refrigeration system, a collector for collecting a condensed water and antifreeze mixture, and a pump or transferring means for transferring the condensed water and antifreeze mixture to the turbine engine, where the antifreeze and condensed water mixture is burned.

DESCRIPTION OF THE PREFERRED EMBODIMENTS

Figure 1:
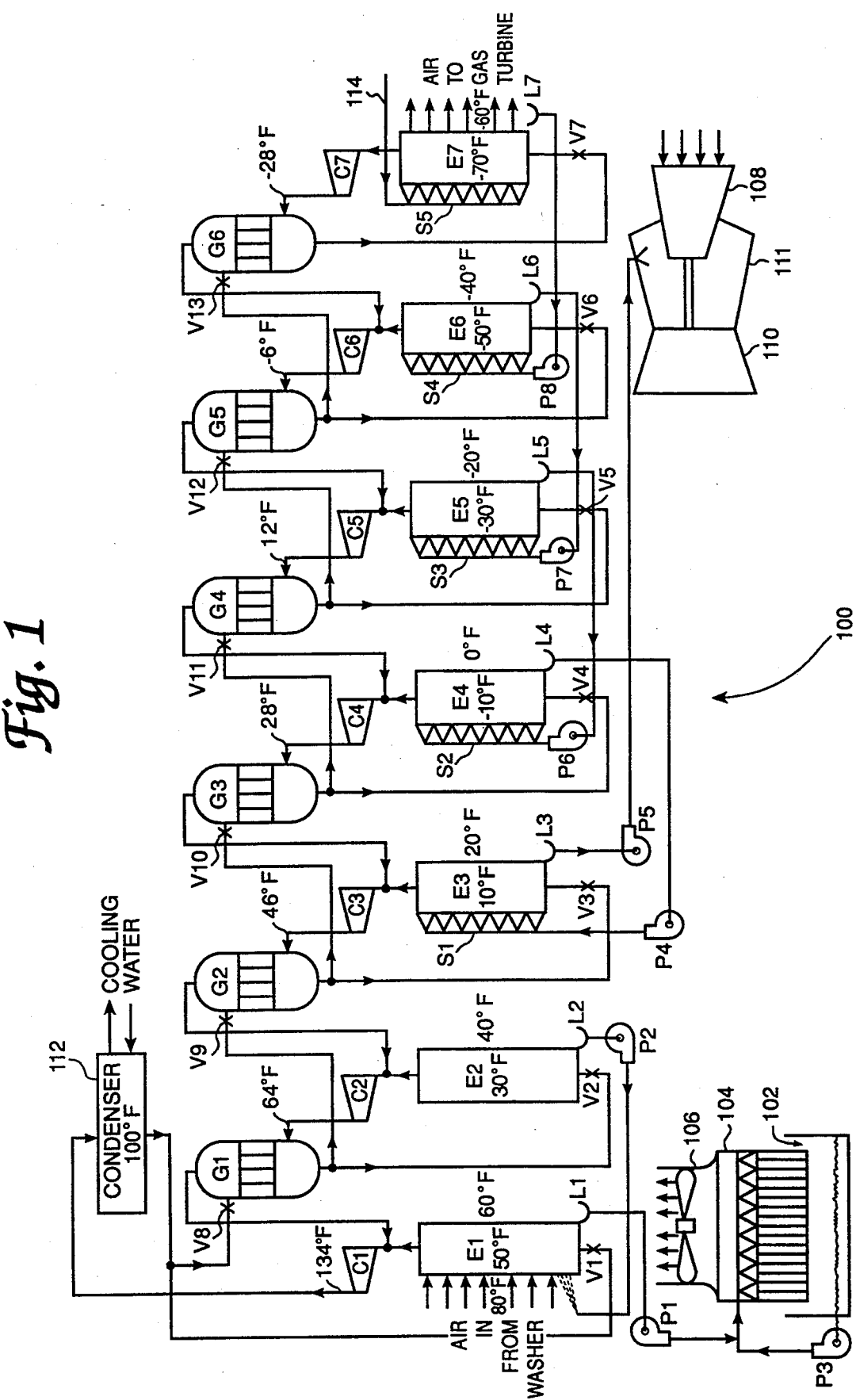
FIG. 1 is a flow diagram illustrating an antifreeze system embodying the present invention.

A first embodiment of the invention relates to a method for preventing ice from forming on a cooling system for air by adding an antifreeze to the air being cooled by the cooling system. The cooled air containing the antifreeze is then transferred into a turbine engine wherein the air and antifreeze are burned in the turbine engine.

In a preferred embodiment, a condensed water and antifreeze mixture is collected and the mixture is transferred to the turbine engine, wherein the mixture is burned in the turbine engine. Preferably, the condensed water and antifreeze mixture has a freezing point below the temperature of the cooled air.

The antifreeze can be any material which can be burned in a turbine engine and which prevents ice from forming on the cooling system. Preferably the antifreeze is combustible. More preferably, the antifreeze is ethyl alcohol or methyl alcohol.

Another embodiment of the invention relates to an apparatus for preventing ice from forming on the refrigeration system for cooling air. The apparatus includes a sprayer for spraying the antifreeze onto the refrigeration system and/or the air being cooled by the refrigeration system, a collector for collecting a condensed water and antifreeze mixture, and a pump or transferring means for transferring the condensed water and antifreeze mixture to the turbine engine, where the antifreeze and condensed water mixture is burned.

The invention will be further explained by the following non-limiting example.

EXAMPLE 1

A refrigeration system 100 can be used to cool the air before it enters the compressor 108 of gas turbine 110, as shown in FIG. 1. Air 102 is drawn into the refrigeration system 100 by the fan 106. The air 102 is first washed to remove contaminants by the air washer 104. The air washer 104 contains spray nozzles which spray water over a multiplicity of contact surfaces where the water sprayed in the system flows concurrent to the flow of air 102 which flows up through the fan 106.

Because air entering the refrigeration system 100 is most likely not saturated with water vapor, a portion of the water sprayed in the system will evaporate and cool the air approximately to the wet bulb temperature. If the air is at the same temperature as the wet bulb temperature, then the air leaving the air washer 104 will be very close to the wet bulb temperature which may be 5° to 30° below the dry bulb temperature.

The primary function of the air washer 104 is to provide intimate contact between the water sprayed into the system and the entering air 102, so that it washes dust particles out of the air 102 and provides a clean cool supply of air for the inlet to the refrigeration system 100. After the air leaves the fan 106, it is ducted through a series of evaporators marked E1, E2, E3, E4, E5, E6 and E7. Each of these evaporators successively cools the air down. For example, in E1 the incoming air's initial temperature of about 80° F. is cooled to about 60° F., in E2 the air is cooled to about 40° F., in E3 the air is cooled to about 20° F., in E4 the air is cooled to about 0° F. in E5 the air is cooled to about −20° F., in E6 the air is cooled to about −40° F., and in E7 the air is cooled to about −60° F. The chilled air stream then enters the compressor 108 to the gas turbine 110.

Many combinations of temperature reductions per evaporator can be used. For example, it generally becomes more economical and efficient to use larger temperature drops in the higher temperature evaporators and smaller temperature drops in the lower temperature evaporators. The refrigeration system shown in FIG. 1 illustrates only one specific set of temperature conditions, and is not limited thereto.

Each of the evaporators E1 through E7 is connected to the suction of a compressor marked C1 through C7, respectively, as shown in FIG. 1.

The compressor C1 compresses the evaporated refrigerant from E1 and discharges it to the condenser 112 where the compressed refrigerant is cooled to form a liquid. The condenser 112 is cooled by any source of cooling, such as water or an air stream blowing over the condenser.

Part of the liquid refrigerant leaving the condenser 112 flows to the inlet of evaporator E1 and expands to a low pressure through the expansion valve V1 and evaporates at a low enough temperature so that it cools the air to about 60° F.

Part of the liquid refrigerant leaving the condenser 112 flows through an expansion valve V8 into a refrigerant gas cooler and mixer G1. The pressure in the refrigerant gas cooler G1 is approximately the same as the pressure at the inlet to compressor C1. Therefore, when the liquid refrigerant flows through the expansion valve V8 into refrigerant gas cooler G1 from the condenser 112 it is expanded to a lower pressure and a part of the liquid refrigerant evaporates or flashes into vapor. This vaporized refrigerant along with the evaporated refrigerant from E1 enters into compressor C1 where they are compressed and discharged into the condenser 112.

Part of the liquid refrigerant in the refrigerant gas cooler G1 is not vaporized and falls to the bottom of the refrigerant gas cooler G1 where it flows through an expansion valve V2 into evaporator E2 where the liquid refrigerant expands to a lower pressure and temperature and cools the air to about 40° F.

The evaporated refrigerant from E2 goes through compressor C2 and is compressed to a pressure corresponding to the pressure in refrigerant gas cooler G1. When the gas is compressed in compressor C2 to the pressure existing in the refrigerant gas cooler G1, the vapor is somewhat superheated and the liquid refrigerant falling down through G1 contacts this vaporized refrigerant coming from the compressor G2 and cools the vaporized refrigerant approximately back to the saturation temperature so that the mixture of vaporized refrigerant leaving the top of G1 and entering compressor C1 is essentially at saturated temperature. By cooling the refrigerant gas leaving G1 down to saturation temperature, the temperature of the refrigerant gas entering C1 is lower than it otherwise would be which significantly reduces the power required by compressor C1.

Part of the liquid refrigerant leaving the bottom of refrigerant gas cooler G1 flows through an expansion valve V9 into the top of refrigerant gas cooler and mixer G2. The pressure in refrigerant gas cooler G2 is approximately the same as the suction pressure of compressor C2. Therefore, when the liquid refrigerant flows through the expansion valve V9 into refrigerant gas cooler G2 it is expanded to a lower pressure and a part of the liquid refrigerant evaporates or flashes into vapor. This vaporized refrigerant along with evaporated refrigerant from E2 enters into compressor C2 where they are compressed and discharged into refrigerant gas cooler G1.

Part of the liquid refrigerant entering refrigerant gas cooler G2 is not vaporized and falls down to the bottom of the refrigerant gas cooler G2 where it flows through an expansion valve V3 into E3 where the liquid refrigerant expands to a lower pressure and temperature and cools the air to about 20° F.

The evaporated refrigerant from evaporator E3 goes through compressor C3 and is compressed to a pressure corresponding to the pressure in refrigerant gas cooler G2. When the gas is compressed in compressor C3 to the pressure existing in the refrigerant gas cooler G2, the vapor is somewhat superheated and the liquid refrigerant falling down through G2 contacts this vaporized refrigerant coming from the compressor G3 and cools the vaporized refrigerant approximately back to saturation temperature so that the mixture of vaporized refrigerant leaving the top of G2 and entering compressor C2 is essentially at saturation temperature. By cooling the refrigerant gas leaving G2 down to saturation temperature, the temperature of the refrigerant gas entering C2 is lower than it otherwise would be which significantly reduces the power required by compressor C2.

Part of the liquid refrigerant leaving the bottom of refrigerant gas cooler G2 flows through an expansion valve V10 into the top of refrigerant gas cooler and mixer G3.

The above process is repeated for each of the succeeding refrigeration steps. Succeeding refrigerant gas coolers G3–G6, compressors C3–C7, evaporators E3–E7, and expansion valves V3–V7 and V10–V13 work as the preceding steps except at successively lower temperatures to cool the air successively to lower temperatures as shown in the diagram.

By using a series of refrigeration steps, as shown in the refrigeration system 100, the total refrigeration power required to cool the air down to −60° F. is greatly reduced compared to using a single stage refrigeration system that would directly evaporate refrigerant down to a temperature low enough to cool the air to −60° F. Therefore, this system has significant advantages in reducing the power required for refrigeration system, and this in turn improves the overall efficiency of the power cycle.

The air leaving the air washer 104 will be nearly saturated with water vapor and this water vapor will condense on the evaporator coils E1–E7 as the temperature is dropped to −60° F. Therefore, the bottom of each of the evaporators E1–E7 contain collectors L1–L7, respectively, which collects the condensed water.

For example, the water that is collected from the evaporator E1 by the collector L1 can be recycled to the air washer 104 using a pump P1 which thereby helps to cool the air and avoid the loss that would occur if this water were merely discarded. The water that is collected from the evaporator E2 by the collector L2 can be, for example, pumped through pump P2 and sprayed onto the coils of evaporator E1 where it is collected by collector L1 and recycled to the air washer 104.

In each successive refrigeration step, water is condensed from the air stream. As the water is reduced in temperature below the freezing point of 32° F., frost will accumulate on the coils and block the air flow. This is a typical problem for refrigeration systems which cool air to low temperatures.

In order to eliminate the problem of frosting on the coils a means for preventing this frost is provided, such as an antifreeze. The pump P4 pumps an antifreeze mixture, such as ethyl alcohol or methyl alcohol, onto the coils through the spray system S1. Preferably the antifreeze is combustible. This creates a mixture of antifreeze and water that does not freeze and which merely drains off the coils of E3 through collector L3 into pump P5. For example, if a compound such as ethyl alcohol is used, this is completely soluble in water and in this case the ethyl alcohol water solution can be pumped by pump P5 and injected into the combustion chamber 111 of the gas turbine 110 where it will be burned and the water will be boiled into steam to provide additional power from the gas turbine 110.

In FIG. 1, the antifreeze 114 is shown entering the spray system S5 into the lowest temperature evaporator E7. However, the antifreeze can be injected into any or all of the evaporators where it is required to prevent freezing of the condensed water. Preferably, the condensed water and antifreeze from evaporator E7 is returned to the higher temperature spray system E6 to minimize antifreeze and refrigeration requirements. For example, the antifreeze and condensed water collected from the coils of evaporator E7 through collector L7 can be pumped through pump P8 and sprayed through the spraying system S4 onto the coils of evaporator E6. The antifreeze and condensed water from evaporator E6 can be collected by collector L6 and pumped through the pump P7 to the spray system S3 onto the coils of evaporator E5. The antifreeze and condensed water from evaporator E5 can be collected by collector L5 and pumped through pump P6 to the spray system S2 onto the coils of evaporator E4. The antifreeze and condensed water from evaporator E4 can be collected by collector L4 and pumped through pump P4 through the spray system S1 onto the coils of evaporator E3. The antifreeze and condensed water from evaporator E3 can be collected by collector L3 and pumped through pump P5 into the combustion chamber 111 of gas turbine 110.

In conventional refrigeration systems, when an antifreeze solution is used to prevent water freezing on evaporator coils a special means must be used to recover the antifreeze because it becomes diluted with the condensed water. In contrast, in the present invention, the condensed water and antifreeze mixture is burned in the turbine engine, which adds to the power output. The only apparent disadvantage is that the antifreeze, such as alcohol, can be a slightly more expensive fuel than is used in the turbine engine for the major part of the power output. However, because the amount of antifreeze relative to the total amount of fuel used is very small, on the order of 2% of the total amount of fuel, it is very economical to use this method of preventing accumulation of frost on the evaporator coils.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, this invention includes all embodiments encompassed within the spirit and scope of the following claims.

I claim:

1. A method for preventing ice forming on a cooling system for air being supplied to a turbine engine, the method comprising the steps of:
    adding an antifreeze to air being cooled by said cooling system; and
    transferring said cooled air containing said antifreeze to said turbine engine.

2. The method according to claim 1, further comprising the steps of collecting a condensed water and antifreeze mixture and transferring said condensed water and antifreeze mixture to said turbine engine.

3. The method according to claim 2, wherein said condensed water and antifreeze mixture has a freezing point below a temperature of said cooled air.

4. The method according to claim 1, wherein said antifreeze is combustible and said combustible antifreeze is burned in said turbine engine.

5. The method according to claim 4, wherein said combustible antifreeze comprises at least one of ethyl alcohol and methyl alcohol.

6. An apparatus for preventing ice from forming on a refrigeration system for cooling air being supplied to a turbine engine, the apparatus comprising:
    spraying means for spraying a combustible antifreeze onto at least one of said refrigeration system and air being cooled by said refrigeration system to thereby form a combustible antifreeze and condensed water mixture; and
    transferring means for transferring said combustible antifreeze and condensed water mixture to a turbine engine, whereby said combustible antifreeze and condensed water mixture is burned in said turbine engine.

7. An apparatus for preventing ice from forming in a cascading refrigeration system comprising a plurality of evaporator coils for cooling air being supplied to a turbine engine, the apparatus comprising:
    first spraying means for spraying a combustible antifreeze on a first evaporator coil said air passes through in said cascading refrigeration system;
    first collecting means for collecting said combustible antifreeze and condensed water from said first evaporator coil; and
    first transferring means for transferring said combustible antifreeze and condensed water to a turbine engine, whereby said combustible antifreeze and condensed water are burned in said turbine engine.

8. The apparatus of claim 6, further comprising:
    second spraying means for spraying said combustible antifreeze and condensed water on a second evaporator coil which is upstream from said first evaporator coil;
    second collecting means for collecting said combustible antifreeze and condensed water from said second evaporator coil; and second transferring means for transferring said combustible antifreeze and condensed water from said first collecting means to said second spraying means, wherein said first transferring means transfers said combustible antifreeze and condensed water from said second evaporator coil to said turbine engine.

9. The apparatus of claim 7, further comprising a plurality of spraying means, collecting means, and transferring means each being associated with an evaporator coil and connected in a manner such that said combustible antifreeze and condensed water is sprayed onto an evaporator coil which is upstream from an evaporator coil from which the combustible antifreeze and condensed water was collected, and wherein said first transferring means transfers said combustible antifreeze and condensed water from an upstream evaporator coil to said turbine engine.

10. The apparatus according to claim 8, wherein each of said evaporator coils which operates at a temperature below the freezing point of water has an associated spraying means, collecting means and transferring means.

11. A method for preventing ice forming on a cascade cooling system for air being supplied to a turbine engine, said cascade cooling system comprising a plurality of evaporator coils through which said air travels, the method comprising the steps of:

applying a combustible antifreeze to a first evaporator coil to prevent ice formation on said first evaporator coil;

collecting condensed water and said antifreeze from said first evaporator coil;

applying said collected combustible antifreeze and condensed water to a second evaporator coil to prevent ice formation on said second evaporator coil;

collecting said antifreeze and condensed water from said second evaporator coil; and burning said collected antifreeze and condensed water in said turbine engine.

12. The method according to claim 11, wherein said condensed water and antifreeze mixture has a freezing point below a temperature of said cooled air.

13. The method according to claim 11, wherein said combustible antifreeze comprises at least one of ethyl alcohol and methyl alcohol.

14. The method according to claim 11, wherein said first condenser coil is colder than said second condenser coil.

* * * * *